(12) United States Patent
Al-Sulaiman et al.

(10) Patent No.: US 11,618,692 B2
(45) Date of Patent: *Apr. 4, 2023

(54) COOLING AND DESALINATION SYSTEM

(71) Applicant: KING FAHD UNIVERSITY OF PETROLEUM AND MINERALS, Dhahran (SA)

(72) Inventors: Fahad A. Al-Sulaiman, Dhahran (SA); Nasiru I. Ibrahim, Dhahran (SA); Hamad A. Al-Mahmoud, Dhahran (SA); Yousif M. Alkhulaifi, Dhahran (SA)

(73) Assignee: KING FAHD UNIVERSITY OF PETROLEUM AND MINERALS, Dhahran (SA)

( * ) Notice: Subject to any disclaimer, the term of this patent is extended or adjusted under 35 U.S.C. 154(b) by 0 days.

This patent is subject to a terminal disclaimer.

(21) Appl. No.: 17/517,497

(22) Filed: Nov. 2, 2021

(65) Prior Publication Data

US 2022/0135438 A1 May 5, 2022

Related U.S. Application Data

(60) Provisional application No. 63/108,693, filed on Nov. 2, 2020.

(51) Int. Cl.
*C02F 1/14* (2023.01)
*B01D 1/00* (2006.01)
(Continued)

(52) U.S. Cl.
CPC .............. *C02F 1/14* (2013.01); *B01D 1/0047* (2013.01); *B01D 3/007* (2013.01); *B01D 5/0003* (2013.01);
(Continued)

(58) Field of Classification Search
CPC .. C02F 1/14; C02F 2103/008; C02F 2303/10; B01D 1/0047; B01D 3/007;
(Continued)

(56) References Cited

U.S. PATENT DOCUMENTS 8,496,234 B1 * 7/2013 Govindan ............... C02F 1/048
261/157
8,647,477 B2 * 2/2014 Govindan ................ B01D 1/16
95/204

(Continued)

FOREIGN PATENT DOCUMENTS

CN       102491440 B    4/2013
CN       207904067 U    9/2018
(Continued)

OTHER PUBLICATIONS

M.S. Saadaway, et al "A Novel Super-Cooled Humidification-Dehumidification System Driver by Thermal Vapor Compression Unit (HDDTVC) For Seawater Desalination", Twelfth International Water Technology Conference, IWTC12, 2008, pp. 1-24. (Year: 2008).*

(Continued)

*Primary Examiner* — Jonathan Miller
(74) *Attorney, Agent, or Firm* — Oblon, McClelland, Maier & Neustadt, L.L.P.

(57) ABSTRACT

A cooling and desalination system includes a humidification-dehumidification (HDH) system and an ejector cooling cycle (ECC) system. The HDH system includes a heater for heating saline water, a humidifier for humidifying a carrier gas using the saline water, and a dehumidifier for dehumidifying the carrier gas to obtain desalinated water. The ECC system includes a generator for generating a primary flow of a refrigerant, an evaporator for cooling and providing a secondary flow of the refrigerant, an ejector for the primary flow and the secondary flow to pass through to obtain a (Continued)

super-heated stream, and a condenser. The heater and the generator are configured to connect to a heat source. The ECC system and the HDH system are connected at the condenser for heat exchange between the super-heated stream and the saline water to pre-heat the saline water.

10 Claims, 4 Drawing Sheets

(51) Int. Cl.
| | |
|---|---|
| B01D 3/00 | (2006.01) |
| B01D 5/00 | (2006.01) |
| F25B 1/06 | (2006.01) |
| F24F 6/02 | (2006.01) |
| C02F 103/08 | (2006.01) |

(52) U.S. Cl.
CPC ........... *B01D 5/006* (2013.01); *B01D 5/0075* (2013.01); *F24F 6/02* (2013.01); *F25B 1/06* (2013.01); *C02F 2103/08* (2013.01); *C02F 2303/10* (2013.01)

(58) Field of Classification Search
CPC .... B01D 5/0003; B01D 5/006; B01D 5/0075; F24F 6/02; F25B 1/06
See application file for complete search history.

(56) References Cited

U.S. PATENT DOCUMENTS

| | | | | |
|---|---|---|---|---|
| 9,834,454 | B2* | 12/2017 | Frolov | B01D 3/007 |
| 10,143,936 | B2* | 12/2018 | Govindan | B01D 3/343 |
| 10,513,445 | B2* | 12/2019 | Govindan | B01D 5/006 |
| 10,532,936 | B2* | 1/2020 | Al-Azazmeh | B01D 5/006 |
| 10,829,913 | B1* | 11/2020 | Ahmed | C02F 1/441 |
| 10,981,082 | B2* | 4/2021 | Govindan | C02F 1/04 |
| 11,097,203 | B1* | 8/2021 | Aguinaldo | B01D 5/0039 |
| 11,142,468 | B2* | 10/2021 | Qasem | B01D 5/0051 |
| 2015/0129410 | A1* | 5/2015 | Govindan | B01D 3/225 |
| | | | | 202/185.1 |
| 2019/0161366 | A1* | 5/2019 | Al-Azazmeh | B01D 3/007 |
| 2020/0263927 | A1* | 8/2020 | Chudnovsky | F28B 9/00 |
| 2022/0135438 | A1* | 5/2022 | Al-Sulaiman | F25B 1/06 |
| | | | | 202/167 |
| 2022/0135439 | A1* | 5/2022 | Alkhulaifi | C02F 1/16 |
| | | | | 203/10 |

FOREIGN PATENT DOCUMENTS

| | | |
|---|---|---|
| CN | 109626473 A | 4/2019 |
| CN | 112939122 A | 6/2021 |

OTHER PUBLICATIONS

Hamad A. Almahmoud, et al., "Energetic performance analysis of a solar-driven hybrid ejector cooling and humidification-dehumidification desalination system.", ENERGY, vol. 230, Sep. 1, 2021, 2 pages (Abstract only).

Hadi Rostamzadeh, "Indirect mechanical heat pump assisted humidification-dehumidification desalination systems", International Journal of Energy Research, vol. 45, 2021, pp. 15892-15920.

Hamad A. Al-Mahmoud, et al., "Thermodynamic performance evaluation of a hybrid ejector cooling and humidification-dehumidification desalination system", Energy Conversion and Management, vol. 225, Dec. 1, 2020, 2 pages (Abstract only).

Ighball Baniasad Askari, et al., "The Parametric Exergo-Economic Analysis of Two Novel Combined Ejector Heat Pump/Humidification-Dehumidification Desalination Systems", ELSEVIER, https://papers.ssm.com/sol3/papers.cfm?abstract_id=3946159, Oct. 20, 2021, 2 pages (Abstract only).

* cited by examiner

COOLING AND DESALINATION SYSTEM

CROSS REFERENCE TO RELATED APPLICATIONS

This application claims benefit of priority to U.S. Provisional Patent Application No. 63/108,693 titled "A HYBRID EJECTOR COOLING AND HUMIDIFICATION-DEHUMIDIFICATION DESALINATION SYSTEM" filed on Nov. 2, 2020, and is related to U.S. Patent Application No. 63/108,683 titled "A COMBINED EJECTOR COOLING AND DESALINATION SYSTEM POWERED BY SOLAR ENERGY" filed on Nov. 2, 2020, both of which are incorporated herein by reference in their entireties.

STATEMENT REGARDING PRIOR DISCLOSURE BY THE INVENTORS

Aspects of the present disclosure appeared in "Energetic performance analysis of a solar-driven hybrid ejector cooling and humidification-dehumidification desalination system" (Energy, 2021, 230, 120849), "Thermodynamic performance evaluation of a hybrid ejector cooling and humidification-dehumidification desalination system" (Energy Conversion and Management, 2020, 225, 113450), and "Performance and exergoeconomic assessment of a novel combined ejector cooling with humidification-dehumidification (HDH) desalination system" (Desalination, 2021, 500, 114843), all of which are incorporated herein by reference in their entireties.

BACKGROUND

Technical Field

The present disclosure is directed generally to cooling and desalination, and more specifically to a cooling and desalination system including an ejector cooling cycle (ECC) system and a humidification-dehumidification (HDH) system, and a co-generation method for concurrent cooling and desalination.

Description of Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

Freshwater production and supply is essential for social and economic development. Globally, the high demand for clean water is ever growing with millions of people seeking access to clean drinking water. Due to the scarcity of fresh water desalination of sea water and saline water has become necessary for sustainable development and better quality of life. Meanwhile, the use of air conditioning systems for comfortable cooling is unavoidable in many parts of the world during the hot summer season. Conventional desalination technologies, such as multi-effect distillation and multi-stage flash distillation, and traditional cooling processes can both be energy-intensive. Integrating cooling systems and desalination systems can help meet the demands for both cooling and fresh water, especially in tropic areas with limited access to clean water.

CN207904067U discloses a hybrid system including an ejector cooling system and an HDH desalination system. Particularly, a single unit functions as a condenser in the ejector cooling system and as a heater in the HDH system.

CN102491440B discloses a hybrid system including an ejector cooling system and an HDH desalination system. Particularly, a single unit functions as a condenser in the ejector cooling system and as a heater in the HDH system. Another single unit functions as an evaporator in the ejector cooling system and as a dehumidifier in the HDH system. As a result, the cooling effect is "consumed internally" by the dehumidifier instead of an external space. Furthermore, a solar system is used to provide heat to the generator and the humidifier.

CN112939122A discloses a hybrid system including a cooling system and an HDH desalination system. In the cooling system, a compressor and a motor, rather than an ejector, are used to heat the refrigerant. Moreover, in the dehumidifier, warm humid air is condensed by the refrigerant instead of saline water.

CN109626473A discloses a hybrid system including a cooling system and an HDH desalination system. The cooling system includes an evaporator, a compressor and a condenser. Besides, the product, i.e. the desalinated water is circulated to pre-heat the saline water. The cooling effect produced by the evaporator is absorbed by dehumidified air.

Rostamzadeh et al. [Indirect mechanical heat pump assisted humidification-dehumidification desalination systems] describes several hybrid systems. However, a compressor is included in addition to an ejector. External heat is provided to only the compressor.

Shahsavar et al. [The Parametric Exergo-Economic Analysis of Two Novel Combined Ejector Heat Pump/Humidification-Dehumidification Desalination Systems] describes a hybrid system including an ejector cooling system and an HDH desalination system. A compressor is installed between the ejector and the condenser. The condenser also functions as the heater, i.e. a single unit. In this open-air, closed-water HDH cycle, the saline water is pre-cooled by the evaporator, which increases the condensation efficiency in the dehumidifier.

Each of the aforementioned references suffers from one or more drawbacks hindering their adoption, as described above. Accordingly, it is an object of the present disclosure to provide systems and methods for a less energy-intensive HDH desalination using synergetic integration with ejector cooling, with a common external heat source providing heat for both the HDH desalination system and the ejector cooling system.

SUMMARY

In an exemplary embodiment, a cooling and desalination system includes a humidification-dehumidification (HDH) system and an ejector cooling cycle (ECC) system. The HDH system includes a heater for heating saline water, a humidifier for humidifying a carrier gas using the saline water, and a dehumidifier for dehumidifying the carrier gas to obtain desalinated water. The ECC system includes a generator for generating a primary flow of a refrigerant, an evaporator for cooling and providing a secondary flow of the refrigerant, an ejector for the primary flow and the secondary flow to pass through to obtain a super-heated stream, and a condenser. The heater and the generator are configured to connect to a heat source. The ECC system and the HDH system are connected at the condenser for heat exchange between the super-heated stream and the saline water to pre-heat the saline water.

In some embodiments, the heater, the generator and the heat source are configured to define a closed cycle path for a working fluid. In some embodiments, an outlet of the heat source is connected to an inlet of the generator. An outlet of the generator is connected to an inlet of the heater. An outlet of the heater is connected to an inlet of the heat source.

In some embodiments, the heater and the generator are configured to independently connect to the heat source.

In some embodiments, the generator, the ejector and the condenser are configured to define a power cycle of the ECC system. The evaporator, the ejector and the condenser are configured to define a refrigeration cycle of the ECC system.

In some embodiments, the cooling and desalination system further includes a fan so that wherein the dehumidifier, the fan and the humidifier are configured to define a closed path cycle for the carrier gas.

In some embodiments, the humidifier includes a spray tower humidifier, a bubble column humidifier, a wetted-wall tower humidifier or a packed bed tower humidifier.

In some embodiments, the dehumidifier includes a bubble column dehumidifier which includes a sparger configured to receive and sparge a humidified carrier gas into a column of desalinated water above the sparger. A tube goes in and out of the bubble column dehumidifier and includes a coil portion that is configured to be in contact with the column of desalinated water, while in operation, for heat exchange between the saline water in the tube and the column of desalinated water.

In some embodiments, the HDH system includes a U-shaped structure wherein the U-shaped structure includes the humidifier, a first connection portion and the dehumidifier serially connected. In some embodiments, the HDH system further includes a second connection portion between the humidifier and the dehumidifier so that the humidifier, the first connection portion, the dehumidifier and the second connection portion are configured to define a closed path cycle for the carrier gas.

In another exemplary embodiment, a cooling and desalination system includes a humidification-dehumidification (HDH) system and an ejector cooling cycle (ECC) system. The HDH system includes a heater for heating saline water, a humidifier for humidifying a carrier gas using the saline water, and a dehumidifier for dehumidifying the carrier gas to obtain desalinated water. The ECC system includes a generator for generating a primary flow of a refrigerant, an evaporator for cooling and providing a secondary flow of the refrigerant, an ejector for the primary flow and the secondary flow to pass through to obtain a super-heated stream, and a condenser. The generator is configured to connect to an external heat source. The ECC system and the HDH system are connected at the heater for heat exchange between the saline water and the super-heated stream to heat the saline water. The ECC system and the HDH system are connected at the condenser for heat exchange between the saline water and the super-heated stream existed from the heater, to pre-heat the saline water.

In some embodiments, the heater includes a first heat exchanger for heat exchange between the saline water within the HDH system and the refrigerant within the ECC system. The condenser includes a second heat exchanger for heat exchange between the saline water within the HDH system and the refrigerant within the ECC system.

In some embodiments, the first heat exchanger and the second heat exchanger are configured such that a first outlet of the dehumidifier is connected to an inlet of the condenser. An outlet of the condenser is connected to a first inlet of the heater. A second outlet of the dehumidifier is connected to a second inlet of the heater.

In some embodiments, the first heat exchanger and the second heat exchanger are configured such that a first outlet of the ejector is connected to an inlet of the heater. An outlet of the heater is connected to a first inlet of the condenser. A second outlet of the ejector is connected to a second inlet of the condenser.

In some embodiments, the generator, the ejector, the heater and the condenser are configured to define a power cycle of the ECC system. The evaporator, the ejector, the heater and the condenser are configured to define a refrigeration cycle of the ECC system.

In some embodiments, the cooling and desalination system further includes a fan so that wherein the dehumidifier, the fan and the humidifier are configured to define a closed path cycle for the carrier gas.

In some embodiments, the humidifier includes a spray tower humidifier, a bubble column humidifier, a wetted-wall tower humidifier or a packed bed tower humidifier.

In some embodiments, the dehumidifier includes a bubble column dehumidifier which includes a sparger configured to receive and sparge a humidified carrier gas into a column of desalinated water above the sparger. A tube goes in and out of the bubble column dehumidifier and includes a coil portion that is configured to be in contact with the column of desalinated water, while in operation, for heat exchange between the saline water in the tube and the column of desalinated water.

In some embodiments, the HDH system includes a U-shaped structure wherein the U-shaped structure includes the humidifier, a first connection portion and the dehumidifier serially connected. In some embodiments, the HDH system further includes a second connection portion between the humidifier and the dehumidifier so that the humidifier, the first connection portion, the dehumidifier and the second connection portion are configured to define a closed path cycle for the carrier gas.

The foregoing general description of the illustrative embodiments and the following detailed description thereof are merely exemplary aspects of the teachings of this disclosure, and are not restrictive.

BRIEF DESCRIPTION OF THE DRAWINGS

A more complete appreciation of this disclosure and many of the attendant advantages thereof will be readily obtained as the same becomes better understood by reference to the following detailed description when considered in connection with the accompanying drawings, wherein.

DETAILED DESCRIPTION

Figure 1:
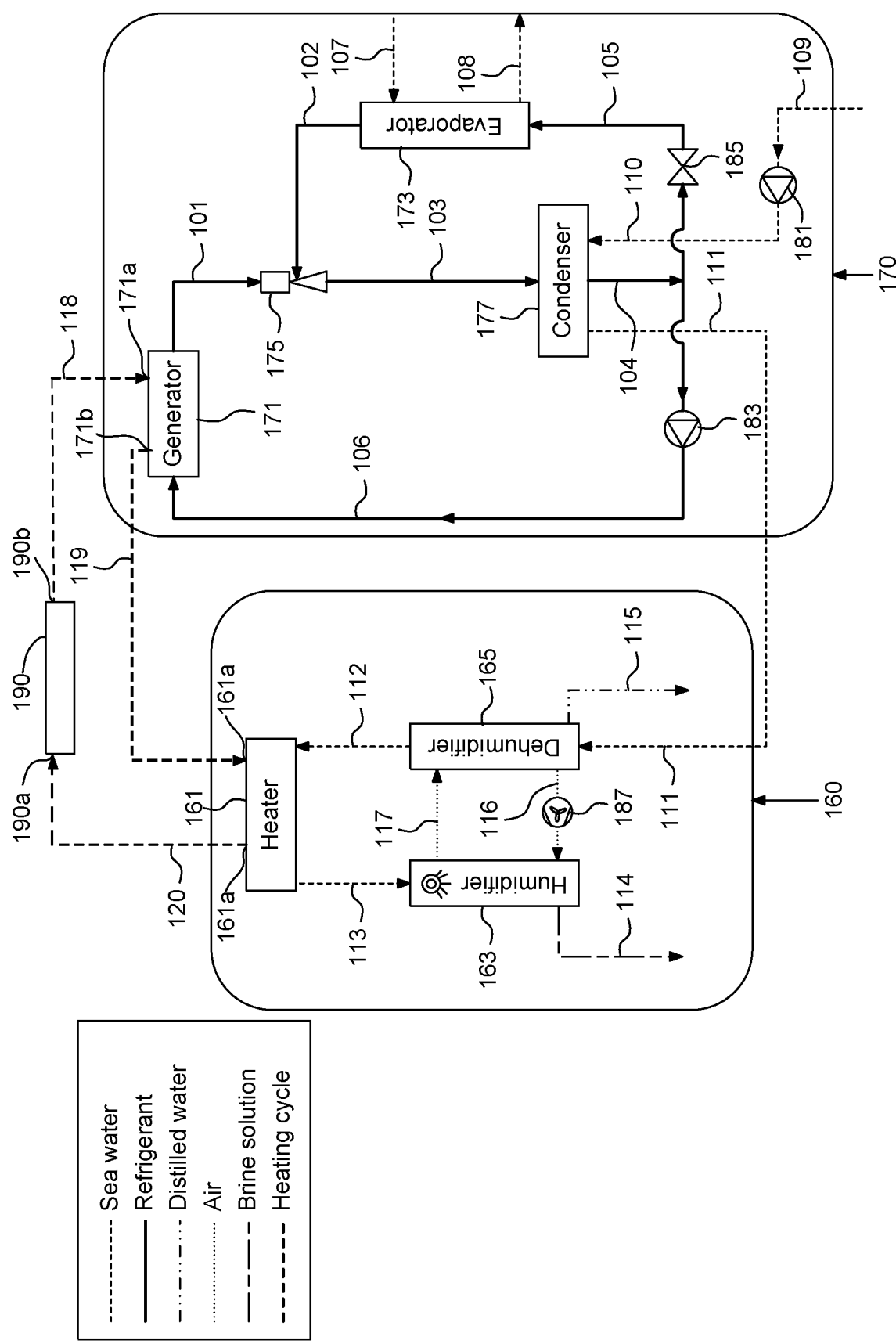
FIG. 1 is a schematic diagram of a cooling and desalination system, according to one embodiment of the present disclosure.

In the drawings, like reference numerals designate identical or corresponding parts throughout the several views.

Further, as used herein, the words "a," "an" and the like generally carry a meaning of "one or more," unless stated otherwise.

Furthermore, the terms "approximately," "approximate," "about," and similar terms generally refer to ranges that include the identified value within a margin of 20%, 10%, or preferably 5%, and any values therebetween.

As mentioned in the Background, both cooling and desalination can be energy-intensive. In both processes, energy mostly comes from fossil fuels that contribute to global warming through greenhouse gas emissions. Consequently, the use of renewable energy sources such as solar energy for water desalination and refrigeration is an attractive alternative. Particularly, ejector cooling is a low-cost, easy, flexible, and reliable system with no moving parts. However, ejector cooling systems are characterized by low thermodynamic performance. System integration to form hybrid ones utilizing a single energy source is one of the strategies to improve their overall energy performance.

According to some aspects of the present disclosure, a hybrid ejector cooling and desalination system is provided. The hybrid system includes an ejector cooling cycle (ECC) system and a humidification-dehumidification (HDH) system. The ECC system and the HDH system can be connected at a condenser of the ECC system for heat exchange. In one embodiment, the heater and the generator are configured to connect to a common external heat source. In another embodiment, the generator is configured to connect to an external heat source while the ECC system and the HDH system are connected at the heater for heat exchange.

Techniques herein include a solar-driven hybrid cooling desalination system, where an ECC system is integrated with an HDH desalination system. Several embodiments of the hybrid system are presented in this disclosure. In one embodiment, a saline stream cools a condenser of the ECC system, thereby recovering the latent heat of condensation and pre-heating the seawater stream before entering a heater of the HDH system to improve the system energy performance. A single-source heating medium provides the input thermal energy to the hybrid system. In this case, the heating medium first enters the generator of the ECC system to heat a working fluid (e.g., a refrigerant) therein. The heating medium is then directed to the heater to provide the required heat input by the HDH system.

In another embodiment, a seawater stream cools warm humid air in the dehumidifier and then cools the condenser of the ECC system, thereby recovering the latent heat of condensation and preheating the seawater before entering the heater of the HDH system to improve the system energy performance. Herein, the primary energy input for the HDH system is obtained through internal heat recovery from the ECC system. Thermodynamic models of the hybrid cooling-desalination system for both embodiments are developed and simulated. In yet another embodiment, the sea water first flows directly into the dehumidifier and then goes back to the condenser, and subsequently enters the heater before entering the humidifier. In yet another embodiment, the seawater first flows directly into the dehumidifier and then the heater while the condenser of the ECC is cooled independently.

Techniques herein provide a co-generation method for concurrent cooling and desalination. The method includes heating saline water in a heater of an HDH system by heat exchange. A carrier gas is humidified in a humidifier of the HDH system using the saline water and then dehumidified in a dehumidifier of the HDH system to obtain desalinated water. The saline water is pre-heated in a condenser of an ECC system by heat exchange. The evaporator is configured to absorb heat and provide a cooling effect. Note that "saline water" as used herein includes saline water, sea water, brackish water and/or the like.

FIG. 1 is a schematic diagram of a cooling and desalination system (also referred to as a hybrid system) 100, according to one embodiment of the present disclosure. As shown, the hybrid system 100 includes a humidification-dehumidification (HDH) system 160 and an ejector cooling cycle (ECC) system 170. The HDH system 160 includes a heater 161 for heating saline water, a humidifier 163 for humidifying a carrier gas (e.g., air) using the saline water, and a dehumidifier 165 for dehumidifying the carrier gas to obtain desalinated water. The ECC system 170 includes a generator 171 for generating a primary flow 101 of a refrigerant, an evaporator 173 for cooling and providing a secondary flow 102 of the refrigerant, an ejector 175 for the primary flow and the secondary flow to pass through to obtain a super-heated stream 103, and a condenser 177.

In the example of FIG. 1, a heat source 190 can be utilized to provide heat to the hybrid system 100. That is, the heater 161 and the generator 171 are configured to connect to the heat source 190. The heat source 190, the generator 171 and the heater 161 can be configured to define a closed cycle path for a working fluid. During operation, the working fluid (a stream 120) flows into the heat source 190 to be heated therein and exits the heat source 190 as a stream 118, which enters the generator 171 to provide heat and exits as a stream 119. The stream 119 enters the heater 161 to provide heat and exits as the stream 120, which flows back to the heat source 190 to be heated again. The cycle repeats so that the heat source 190 is configured to provide heat to the generator 171 and the heater 161 via the working fluid. The heat source 190 can include different sources such as solar collectors, waste heat from other processes, and gas heaters. Note that in another example (not shown), the heater 161 and the generator 171 can be configured to independently connect to the heat source 190.

In this example, a first outlet 190b of the heat source 190 is connected to a first inlet 171a of the generator 171. A first outlet 171b of the generator 171 is connected to a first inlet 161a of the heater 161. A first outlet 161b of the heater 161 is connected to a first inlet 190a of the heat source 190. In another example (not shown), the heat source 190 may switch directions. That is, the working fluid may be heated in the heat source 190, exit the heat source 190, flow into the heater 161, flow into the generator 171 and be pumped back to the heat source again. In yet another example (not shown), the heater 161 and the generator 171 may be configured to independently connect to the heat source 190. Consequently, the heater 161 and the generator 171 may receive working fluids from the heat source 190 at similar or identical temperatures.

In a non-limiting example, the heat source 190 is a solar thermal collector. The solar thermal collector is a device that receives and converts solar energy to thermal energy and heats the working fluid to a suitable temperature for different heat-driven applications, such as cooling, water desalination, space heating, and industrial process heating. The solar thermal collector is configured such that the working fluid exiting the solar thermal collector has a temperature of at least 80° C., preferably 90-120° C., preferably 100-110° C., which is suitable for the ECC system 170. The solar thermal collector can include various types of solar thermal collectors such as a flat-plate collector, an evacuated tube collector, a parabolic trough, a photovoltaic-thermal collector (PVT), and/or the like. The heating fluid can include water or thermal oil and is circulated through the solar thermal collector using a pump (not shown) to transfer the thermal energy from the solar collector directly to the heat-driven system (e.g. the ECC system 170) or to a thermal storage tank (not shown). The solar collector can be connected to the generator 171 of the ECC system 170 through pipes that may be of different types such as a metallic type or a plastic-based material (e.g. polyvinyl chloride, PVC, etc.). The heat source 190 can also include other sources such as waste heat from other processes and gas-fired heaters.

As shown in FIG. 1, the ECC system 170 includes the generator 171, the evaporator 173, the ejector 175 and the condenser 177. The generator 171, the ejector 175 and the condenser 177 can be configured to define a power cycle of the ECC system 170 for an internal working fluid (also referred to as refrigerant) during operation. The evaporator 173, the ejector 175 and the condenser 177 can be configured to define a refrigeration cycle of the ECC system 170 for the refrigerant during operation. Different refrigerants can be used in the ECC system 170, such as R134a, R290, R600, R600a, R245fa, etc. As mentioned earlier, the heat source 190 can provide heat to the generator 171 to obtain the primary flow 101 of the refrigerant. For example, heat can be supplied to the generator 171 by the stream 118 from a low-grade heat source such as waste heat at a temperature around 100° C. to vaporize the refrigerant to obtain a supersonic refrigerant vapor as the primary flow 101.

Figure 2:
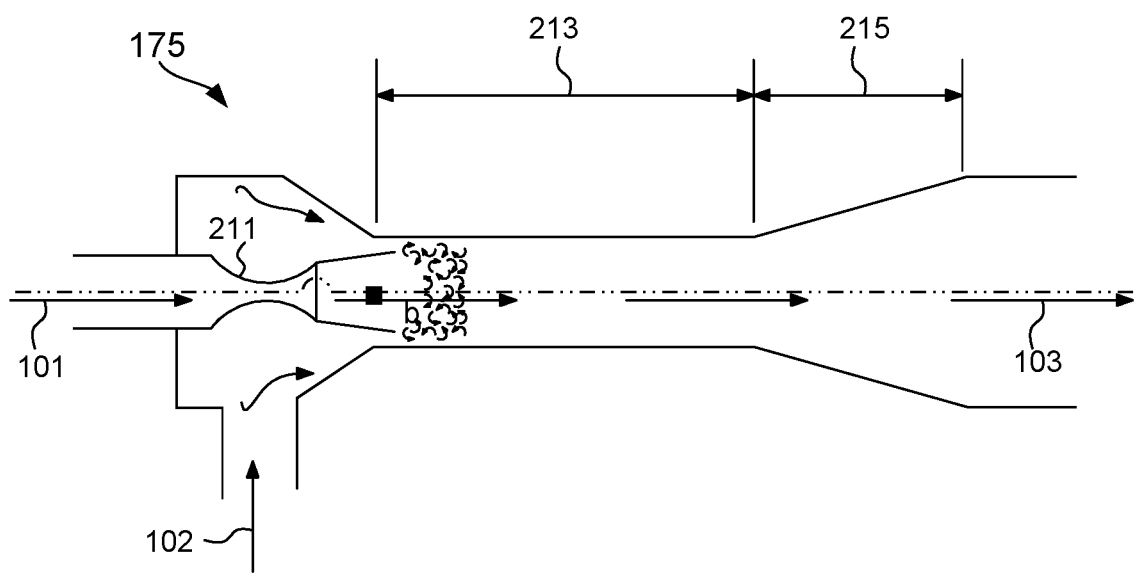
FIG. 2 is a schematic of an ejector, according to some embodiments of the present disclosure.

FIG. 2 is a schematic of the ejector 175 in FIG. 1, according to some embodiments of the present disclosure. As illustrated, the primary flow 101 can expand in a nozzle 211, such as a convergent-divergent nozzle, to become supersonic at an outlet of the nozzle 211. The primary flow 101 then flows into a mixing chamber 213 of the ejector 175 with a strong disturbance caused by the immediate increase of the flow channel area. The mixing chamber 213 can be designed as a segment having a constant cross-sectional area but often has a tapered inlet section. The low pressure created at an outlet of the nozzle 211 of the ejector 175 allows the secondary flow 102 to be sucked due to the vacuum created. The secondary flow 102 is provided by the evaporator 173. The secondary flow 102 that is low-pressure can be entrained by the primary flow 101 that is high-velocity, resulting in acceleration until becoming supersonic in the constant-area section. The two flows undergo a constant pressure mixing in the ejector 175. During mixing, a transfer of momentum from the primary flow 101 to the secondary flow 102 results in a deceleration of the combined flow followed by recompression due to a normal shock. That is, a mixed refrigerant vapor of the primary flow 101 and the secondary flow 102 undergoes a sudden drop in velocity and an increase in pressure due to the development of normal shock in the mixing chamber 213 and then passes through a diffuser 215 of the ejector 175, where the pressure recovery takes place. The diffuser 215 further decelerates the mixed refrigerant vapor at the outlet of the ejector 175. As a result, a mixed refrigerant (also referred to as the super-heated stream) 103 exits the ejector 175 at a superheated state. For example, the mixed refrigerant 103 can exit the ejector 175 at a temperature around 40-60° C., preferably around 45-55° C., preferably around 50° C., depending on the type of refrigerant used and the amount of input energy to the generator 171. The significant presence of thermal energy at the outlet of the ejector 175, i.e. the super-heated stream 103, is utilized to power a first-stage heating of saline water (e.g. a stream 110) which will later on enter the HDH system 160.

Referring back to FIG. 1, the mixed refrigerant 103 enters the condenser 177 and is cooled down by the stream 110 in the HDH system, which will be explained in detail later. As a result, a stream 104, such as a condensed refrigerant, exits the condenser 177 and is distributed or separated into two streams. One stream of the two streams is pumped back to the generator 171 as a stream 106 by a pump 183. The other stream of the two streams is expanded through a valve 185, such as an expansion or throttling valve, where both temperature and pressure of the stream 110 are decreased to obtain a stream 105. For example, the stream 105 can enter the evaporator 173 at a temperature of about 5° C. The stream 105 is evaporated by an external circulating working fluid (a stream 107) in the evaporator 173 and produces a cooling effect, for example for air conditioning applications. That is, the stream 107 absorbs the latent heat of evaporation of the refrigerant. Consequently, a low-pressure vaporized vapor (also referred to as a stream 102 or the secondary flow 102) exits the evaporator 173 and is then sucked by the high-pressure motive stream (e.g., the primary flow 101) in the ejector 175. The power cycle and the refrigeration cycle of the ECC system continue.

Still referring to FIG. 1, the ECC system 160 and the HDH system 170 are connected at the condenser 177 for heat exchange between the super-heated stream 103 and the stream 110, such as saline water, to pre-heat the saline water. In operation, a stream 109 of saline water can be at a typical temperature range of 10-35° C., preferably 15-30° C., preferably 20-25° C. The stream 109 is pumped through the condenser 177 by a water pump 181 to cool the super-heated stream 103 of the refrigerant in the ECC system 170. Then, the saline water exits the condenser 177 as a stream 111 and enters the HDH system 160. This arrangement eliminates the use of a separate heat rejection fluid for the ECC system 170, and at the same time, pre-heating the saline water. The pre-heated saline water by the condenser 177, (which could be up to about 15° C. increase in temperature) can minimize the required input energy by the HDH system 160. The water pump 181 used to circulate the saline water can be a centrifugal pump or a positive displacement type, depending on the practical requirement.

In some embodiments, the condenser 177 includes a heat exchanger for heat exchange between the saline water within the HDH system 160 and the refrigerant within the ECC system 170. The term "heat exchanger" is used to include any heat exchange mechanism through which a coolant or a heat transfer medium can circulate. In some examples, the condenser 177 may include one or more discrete heat exchange devices coupled in series or in parallel. The condenser 177 may include any type of heat exchanger, such as a plate-type heat exchanger, a shell-type heat exchanger, a double-pipe heat exchanger or the like, which generally provides an enlarged effective heat exchanging area by, for example, being corrugated and/or provided with protruding portions of some suitable kind, such as flanges, to allow for heat transfer between two fluids. Note that the heater 161 and the generator 171 can also include a heat exchanger respectively.

In one embodiment, the condenser 177 includes a shell-type heat exchanger, which includes a shell structure and one or more tube structures inside the shell structure. A first fluid can flow through the one or more tube structures while a second fluid can flow over the tube structures (i.e., through the shell structure) so that heat is exchanged between the first fluid and the second fluid. The tube structures can include a thermal-conductive material to facilitate heat exchange between the first fluid and the second fluid, while the shell structures may include a thermal-insulating material to reduce heat loss to or heat gain from the environment. Further, the number of the tube structures, dimensions of the shell structure and the tube structures, geometry of the shell structure and the tube structures, etc. can be tailored to meet specific design requirements.

In another embodiment, the condenser 177 includes a plate-type heat exchanger, which includes a plurality of plates stacked in series along a longitudinal axis, with the plates having the shape of a rectangle or square, or alternatively circular or cylindrical. The stack of plates can include an alternating series of hot plates (hot fluid plates) and cold plates (cold fluid plates) to allow for heat exchange.

Further, the HDH system 160 includes the heater 161, the humidifier 163, and the dehumidifier 165. In the example of FIG. 1, a closed-air, open-water (CAOW) water-heated HDH cycle is shown. The hybrid system 100 utilizes heat dissipated from the condenser 177 to pre-heat incoming saline water entering the HDH system 160. The pre-heated saline water (the stream 111) enters the dehumidifier 165 and condenses incoming humid air (a stream 117), thereby producing fresh water (a stream 115). In the dehumidifier 165, the saline water is further pre-heated by the latent heat of condensation and exits as a stream 112 before entering the heater 161. Subsequently, the heater 161 heats the saline water to a suitable temperature (50-70° C., preferably 55-65° C., preferably around 60° C.) for humidification. The saline water (a stream 113) heated then enters the humidifier 163, where the stream 113 humidifies an incoming airstream to obtain humid air (a stream 117). The humid air then moves to the dehumidifier 165, where the humid air is cooled and dehumidified. The dehumidification process produces fresh water, which is then discharged as a stream 115. After the dehumidification, the air is recirculated as a stream 116 by a fan 187 to the humidifier 163. In addition, the HDH system 160 may include a closed-air, closed-water HDH cycle, or an open-air, closed-water HDH cycle, or an open-air, open-water HDH cycle in other examples (not shown).

Note that in the example of FIG. 1, the saline water is pre-heated in the condenser 177 before being passed through the dehumidifier 165 and the heater. In another example (not shown), the saline water can be passed through the dehumidifier 165 before being pre-heated by the condenser 177, after which the saline water is passed through the heater 161. As a result, the saline water has a relatively low temperature and can condense the humid air in the dehumidifier 163 with a relatively high efficiency, compared to the FIG. 1 example.

While not shown, in one embodiment, the humidifier 163 includes a spray tower humidifier that includes a vessel. A plurality of nozzles can be placed in the vessel and configured to spray the stream 113 (e.g., heated saline water) downward while the stream 116 (e.g., air) enters the vessel from a bottom of the vessel and moves upward to exit a top of the vessel. Such countercurrent flows of the streams 113 and 116 can promote heat and mass transfer between the heated saline water and the air. In another embodiment, the humidifier 163 may include a bubble column humidifier, a wetted-wall tower humidifier or a packed bed tower humidifier.

In one example, the dehumidifier 165 includes a bubble column dehumidifier (not shown). The bubble column dehumidifier can include a vessel. A sparger can be positioned near a bottom of the vessel and configured to receive and sparge a warm humidified carrier gas into a column of desalinated water above the sparger. A tube that goes in and out of the bubble column dehumidifier can includes a coil portion that is configured to be in contact with the column of desalinated water, while in operation, for heat exchange between the saline water in the tube and the column of desalinated water. In another example (not shown), the dehumidifier 165 includes a vessel and one or more cooling coils in the vessel. Warm humid air can be passed through the vessel in an opposite direction to the saline water in the one or more cooling coils. Herein, heat exchange can take place on outer surfaces of the cooling coils between the warm humid air and the saline water.

In some embodiments, the HDH system 160 includes a U-shaped structure (not shown) wherein the U-shaped structure includes the humidifier 163, a first connection portion and the dehumidifier 165 serially connected. For example, the humidifier 163 can include the aforementioned spray tower humidifier while the dehumidifier 165 can include the aforementioned vessel and cooling coils. Air is passed though the aforementioned spray tower humidifier in an upward direction before entering the first connection portion which is curved. As a result, the air is directed to pass through the vessel and cooling coils in a downward direction. In one embodiment, the U-shaped structure includes a unitary pipe that includes the vessel of the humidifier 163, the first connection, and the vessel of the dehumidifier 165. Further, the HDH system 160 can include a second connection portion (not shown) between the humidifier 163 and the dehumidifier 165. Consequently, the humidifier 163, the first connection portion, the dehumidifier 165 and the second connection portion are configured to define a closed path cycle for the carrier gas. In other words, during operation, the air can circulate through, in sequence, the humidifier 163, the first connection portion, the dehumidifier 165 and the second connection portion.

Further, in some embodiments, an outlet of the condenser 177 is connected to a second inlet of the generator 171 and an inlet of the evaporator 173. A second outlet of the generator 171 is connected to a first inlet of the ejector 175 while an outlet of the evaporator 173 is connected to a second inlet of the ejector 175. An outlet of the ejector 175 is connected to an inlet of the condenser 177.

In some embodiments, the dehumidifier 165, the fan 187 and the humidifier 163 are configured to define a closed path cycle for the carrier gas. Particularly, a first outlet of the dehumidifier 165 is connected to an inlet of the fan 187. An outlet of the fan 187 is connected to a first inlet of the humidifier 165. A first outlet of the humidifier 165 is connected to a first inlet of the dehumidifier 165. In some embodiments, the condenser 177, the dehumidifier 165, the heater 161 and the humidifier 163 are configured to define a path for the saline water. Specifically, a second inlet of the condenser 177 is configured to receive saline water, for example by the water pump 181. A second outlet of the condenser 177 is connected to a second inlet of the dehumidifier 165. A second outlet of the dehumidifier 165 is connected to a second inlet of the heater 161. A second outlet of the heater 161 is connected to a second inlet of the humidifier 163.

Coefficient of performance (COP) of the ECC system 170 can be obtained by dividing refrigeration (heated absorbed by the evaporator 173) by the sum of heat input to the generator 171 and power consumed by the pump 183. The hybrid system 100 improves the COP by at least 5%, preferably at least 10%, preferably between 10 and 30%, compared to a conventional ECC system uncoupled to an HDH system. Efficiency of the HDH system 160 is defined by Narayan et al. [Energy Effectiveness of Simultaneous Heat and Mass Exchange Devices, incorporated herein in its entirety]. The hybrid system 100 improves the efficiency of the HDH system 160 by at least 5%, preferably at least 10%, preferably between 10 and 30%, compared to a conventional HDH system uncoupled to an ECC system.

Figure 3A:
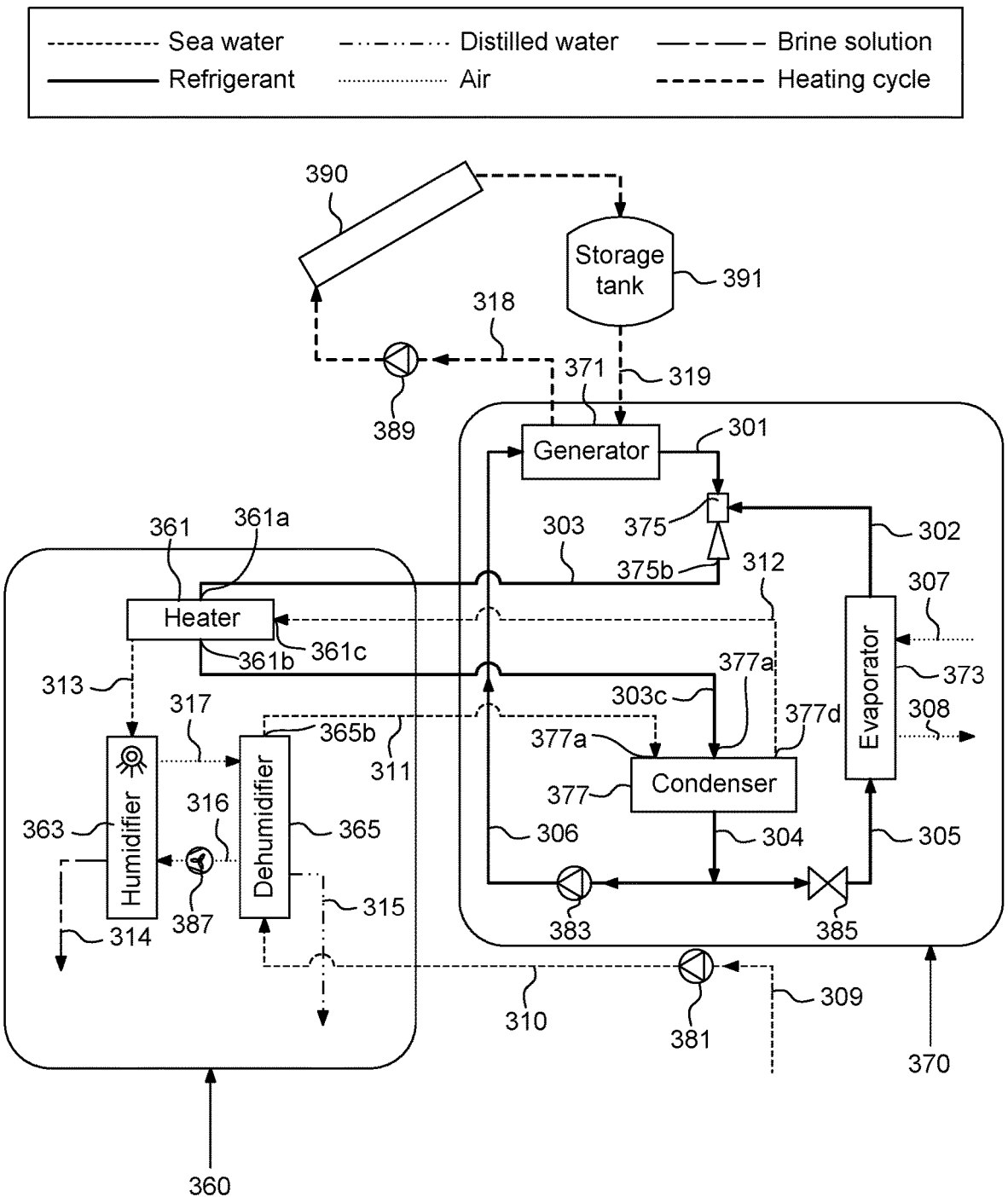
FIG. 3A is a schematic diagram of a cooling and desalination system, according to another embodiment of the present disclosure.

FIG. 3A is a schematic diagram of a cooling and desalination system 300A (also referred to as a hybrid system 300A), according to another embodiment of the present disclosure. The embodiment of the hybrid system 300A is similar to the embodiment of the hybrid system 100. Particularly, a heater 361, a dehumidifier 363 and a humidifier 365 of an HDH system 360 respectively corresponds to the heater 161, the dehumidifier 163 and the humidifier 165 of the HDH system 160. A generator 371, an evaporator 373, an ejector 375 and a condenser 377 of an ECC system 370 respectively corresponds to the generator 171, the evaporator 173, the ejector 175 and the condenser 177 of the ECC system 170. A water pump 381, a pump 383, a valve 385 and a fan 387 respectively corresponds to the water pump 181, the pump 183, the valve 185 and the fan 187.

Different from the embodiment of the hybrid system 100, a heat source 390 is connected to the generator 371 without being connected to the heater 361, as shown in FIG. 3A. A storage tank 391 is optionally included. The heat source 390, the storage tank 391 and the generator 371 can be configured to define a closed cycle path for a working fluid, which is pumped by a pump 389.

Further, in the example of FIG. 3A, the ECC system 370 and the HDH system 360 are connected at both the condenser 377 and the heater 361. As a result, the generator 371, the ejector 375, the heater 361 and the condenser 177 can be configured to define a power cycle of the ECC system 370 for a refrigerant) during operation. The evaporator 173, the ejector 175, the heater 361 and the condenser 177 can be configured to define a refrigeration cycle of the ECC system 370 for the refrigerant during operation. A super-heated stream 303, which corresponds to the super-heated stream 103, provides heat to the heater 361. A stream 303a exiting the heater 361 has a lower temperature than the stream 303 and can be used to pre-heated saline water (a stream 311).

Herein, the dehumidifier 365, the condenser 377, the heater 361 and the humidifier 363 can be configured to define a cycle path for the saline water during operation. Specifically, the saline water is configured to cool warm, humid air in the dehumidifier 365 before being pre-heated in the condenser 377. Then, the saline water is heated in the heater 361 before being passed through the humidifier 363.

Similar to the heater 161 and the condenser 177, the heater 361 and the condenser 377 can respectively include a first heat exchanger and a second heat exchanger. In this example, a first outlet 375b of the ejector 375 is connected to a first inlet 361a of the heater 361. A first outlet 361b of the heater 361 is connected to a first inlet 377a of the condenser 377. A first outlet 365b of the dehumidifier 365 is connected to a second inlet 377c of the condenser 377. An outlet 377d of the condenser 377 is connected to a second inlet 361c of the heater 361.

In another example, a second outlet (not shown) of the dehumidifier 365 is further connected to a third inlet (not shown) of the heater 361. That is, the stream 311 exiting from the dehumidifier 365 is split or separated into two streams. One of the two streams flows into the condenser 377 before flowing into the heater 361, and the other one of the two streams flows into the heater 361 directly. Alternatively, one of the two streams flows into the condenser 377 before flowing directly into the humidifier 363, and the other one of the two streams flows into the heater 361 directly before flowing into the humidifier 363. In other words, the saline water (a cold fluid) can exchange heat with the refrigerant (a hot fluid) in multiple stages.

In yet another example, a second outlet (not shown) of the ejector 375 is connected to a third inlet (not shown) of the condenser 377. That is, the stream 303 exiting from the ejector 375 is split or separated into two streams. One of the two streams flows into the heater 361 before flowing into the condenser 377, and the other two streams flows into the condenser directly. Alternatively, one of the two streams flows into the heater 361 before flowing directly into the generator 371, and the other two streams flows into the condenser directly before flowing into the generator 371. In other words, the refrigerant (a hot fluid) can exchange heat with the saline water (a cold fluid) in multiple stages.

In both examples where heat exchange can occur in multiple stages, the COP is improved by at least 5%, preferably at least 10%, preferably between 10 and 30%, compared to a conventional ECC system uncoupled to an HDH system. The efficiency of the HDH system 360 is improved by at least 5%, preferably at least 10%, preferably between 10 and 30%, compared to a conventional HDH system uncoupled to an ECC system.

Figure 3B:
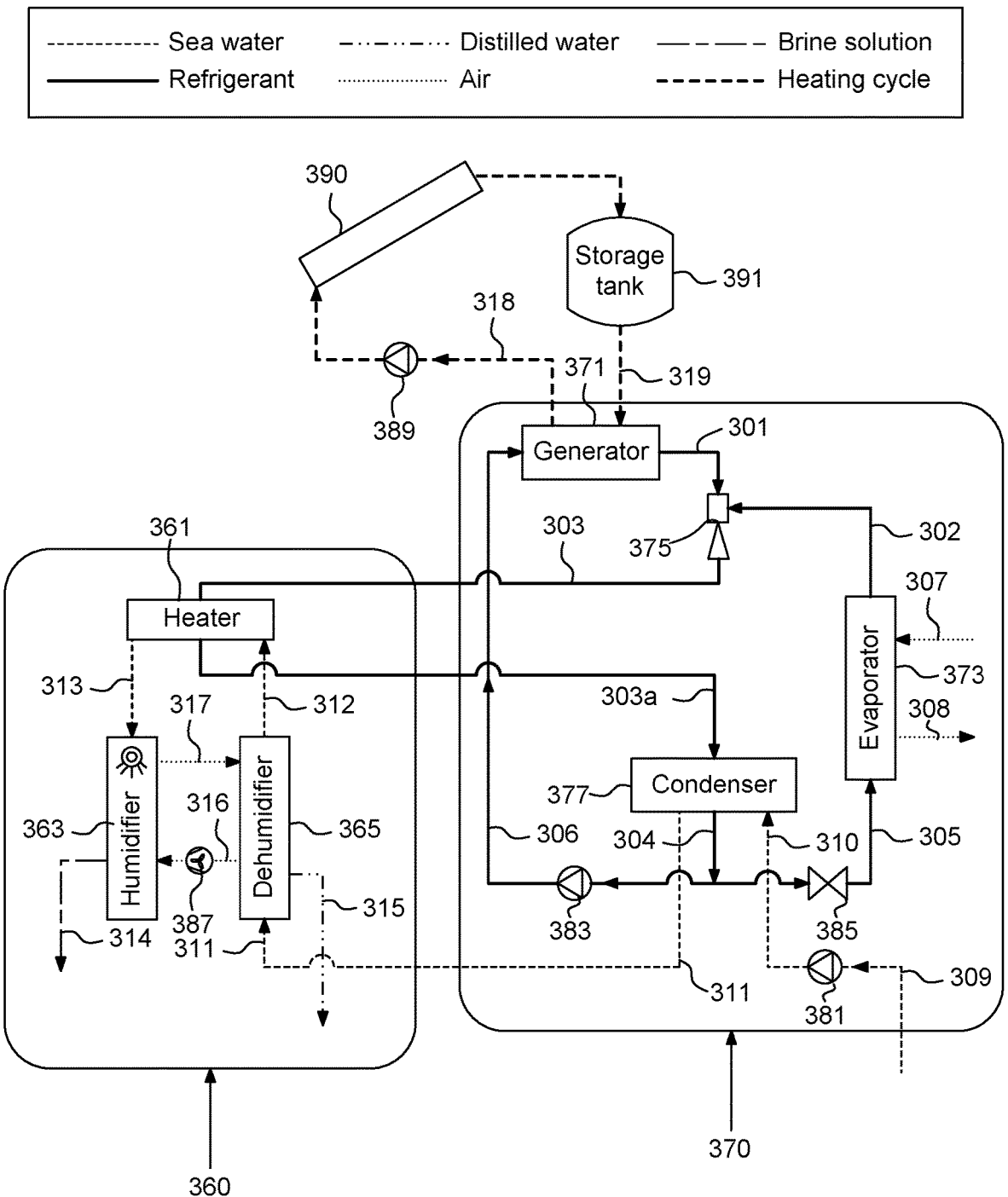
FIG. 3B is a schematic diagram of a cooling and desalination system, according to yet another embodiment of the present disclosure.

FIG. 3B is a schematic diagram of a cooling and desalination system 300B (also referred to as a hybrid system 300B), according to yet another embodiment of the present disclosure. The embodiment of the hybrid system 300B is similar to the embodiment of the hybrid system 300A, except that saline water is configured to pass through the condenser 377 before passing through the dehumidifier 365, and subsequently flow into the heater 361 and then the humidifier 363. In another embodiment (not shown), the saline water can be configured to enter the dehumidifier 365 and then the heater 361 without passing through the condenser 377. The condenser 377 is cooled independently by an external cooling stream.

Obviously, numerous modifications and variations of the present disclosure are possible in light of the above teachings. It is therefore to be understood that within the scope of the appended claims, the invention may be practiced otherwise than as specifically described herein.

The invention claimed is:

1. A cooling and desalination system, comprising:
   a humidification-dehumidification (HDH) system comprising a heater for heating saline water, a humidifier for humidifying a carrier gas using the saline water, and a dehumidifier for dehumidifying the carrier gas to obtain desalinated water; and
   an ejector cooling cycle (ECC) system comprising a generator for generating a primary flow of a refrigerant, an evaporator for cooling and providing a secondary flow of the refrigerant, an ejector for the primary flow and the secondary flow to pass through to obtain a super-heated stream, and a condenser;
   wherein the generator is configured to connect to an external heat source, and the heater is configured to connect to no external heat source,
   wherein the ECC system and the HDH system are connected at the heater for heat exchange between the saline water exited from the condenser and the super-heated stream exited from the ejector to heat the saline water,
   wherein the ECC system and the HDH system are connected at the condenser for heat exchange between the saline water exited from the dehumidifier and the super-heated stream exited from the heater, to pre-heat the saline water.

2. The cooling and desalination system of claim 1, wherein:
   the heater comprises a first heat exchanger for heat exchange between the saline water within the HDH system and the refrigerant within the ECC system, and the condenser comprises a second heat exchanger for heat exchange between the saline water within the HDH system and the refrigerant within the ECC system.

3. The cooling and desalination system of claim 2, wherein the first heat exchanger and the second heat exchanger are configured such that:
   a first outlet of the dehumidifier is connected to an inlet of the condenser,
   an outlet of the condenser is connected to a first inlet of the heater, and
   a second outlet of the dehumidifier is connected to a second inlet of the heater.

4. The cooling and desalination system of claim 2, wherein the first heat exchanger and the second heat exchanger are configured such that:
   a first outlet of the ejector is connected to an inlet of the heater,
   an outlet of the heater is connected to a first inlet of the condenser, and
   a second outlet of the ejector is connected to a second inlet of the condenser.

5. The cooling and desalination system of claim 1, wherein:
   the generator, the ejector, the heater and the condenser are configured to define a power circuit of the ECC system, and
   the evaporator, the ejector, the heater and the condenser are configured to define a refrigeration circuit of the ECC system.

6. The cooling and desalination system of claim 1, further comprising a fan so that wherein the dehumidifier, the fan and the humidifier are configured to define a closed path cycle for the carrier gas.

7. The cooling and desalination system of claim 1, wherein the humidifier comprises a spray tower humidifier, a bubble column humidifier, a wetted-wall tower humidifier or a packed bed tower humidifier.

8. The cooling and desalination system of claim 1, wherein the dehumidifier comprises a bubble column dehumidifier including:
   a sparger configured to receive and sparge a humidified carrier gas into a column of desalinated water above the sparger; and
   a tube going in and out of the bubble column dehumidifier and including a coil portion that is configured to be in contact with the column of desalinated water, while in operation, for heat exchange between the saline water in the tube and the column of desalinated water.

9. The cooling and desalination system of claim 1, wherein the HDH system comprises a U-shaped structure wherein the U-shaped structure includes the humidifier, a first connection portion and the dehumidifier serially connected.

10. The cooling and desalination system of claim 9, wherein the HDH system further comprises a second connection portion between the humidifier and the dehumidifier so that the humidifier, the first connection portion, the dehumidifier and the second connection portion are configured to define a closed path cycle for the carrier gas.

\* \* \* \* \*